United States Patent
Soryal et al.

(10) Patent No.: US 11,349,983 B2
(45) Date of Patent: May 31, 2022

(54) PROTECTING USER DATA DURING AUDIO INTERACTIONS

(71) Applicant: AT&T Intellectual Property I, L.P., Atlanta, GA (US)

(72) Inventors: Joseph Soryal, Ridgewood, NY (US); Naila Jaoude, Eatontown, NJ (US); Samuel N. Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/921,854

(22) Filed: Jul. 6, 2020

(65) Prior Publication Data
US 2022/0006898 A1 Jan. 6, 2022

(51) Int. Cl.
*H04M 3/22* (2006.01)
*H04M 1/57* (2006.01)
*H04M 1/80* (2006.01)

(52) U.S. Cl.
CPC ......... *H04M 3/2281* (2013.01); *H04M 1/575* (2013.01); *H04M 1/80* (2013.01); *H04M 2201/40* (2013.01); *H04M 2201/41* (2013.01)

(58) Field of Classification Search
CPC combination set(s) only.
See application file for complete search history.

(56) References Cited

U.S. PATENT DOCUMENTS

| | | | |
|---|---|---|---|
| 5,742,675 A * | 4/1998 | Kilander | H04M 3/5125 379/266.09 |
| 7,502,741 B2 | 3/2009 | Finke et al. | |
| 8,433,915 B2 | 4/2013 | Doren | |
| 10,148,694 B1 * | 12/2018 | Sarin | G06F 21/60 |
| 10,313,845 B2 | 6/2019 | Koul et al. | |
| 10,453,447 B2 | 10/2019 | Schmidt et al. | |
| 10,522,138 B1 | 12/2019 | Sambarino | |
| 2009/0040948 A1 * | 2/2009 | Wengrovitz | H04M 3/56 370/260 |

(Continued)

OTHER PUBLICATIONS

Amazon Transcribe now supports automatic content redaction, Feb. 26, 2020, https://aws.amazon.com/about-aws/whats-new/2020/02/amazon-transcribe-now-supports-automatic-content-redaction/.

(Continued)

*Primary Examiner* — Phung-Hoang J Nguyen

(57) ABSTRACT

A method for protecting user data during an audio interaction includes various operations performed by a processing system including at least one processor. In one example, the operations include detecting an audio signal that is part of an interaction between a user and another party, converting the audio signal into a string of text, detecting that the interaction is likely to put sensitive data of the user at risk, based on a comparison of the string of text to a library of interactions that are known to put sensitive data at risk, and sending an alert to notify the user that the interaction is likely to put the sensitive data of the user at risk, wherein the alert is sent to prevent the user from providing the sensitive data to the another party, and wherein the method is performed contemporaneously with an occurrence of the interaction.

20 Claims, 3 Drawing Sheets

(56) References Cited

U.S. PATENT DOCUMENTS

| | | | | |
|---|---|---|---|---|
| 2013/0266127 | A1* | 10/2013 | Schachter | H04M 3/5175 |
| | | | | 379/88.01 |
| 2014/0270118 | A1* | 9/2014 | Kolodizner | H04M 3/53 |
| | | | | 379/88.17 |
| 2017/0061409 | A1* | 3/2017 | Morecki | G06Q 50/01 |
| 2019/0164539 | A1* | 5/2019 | Schmidt | G10L 25/51 |
| 2019/0199745 | A1* | 6/2019 | Jakobsson | H04L 51/12 |
| 2019/0341129 | A1* | 11/2019 | Toyoda | G16H 10/60 |
| 2020/0100072 | A1* | 3/2020 | Fagundes | H04W 4/12 |
| 2020/0137050 | A1* | 4/2020 | Reddimasi | H04L 63/0861 |
| 2020/0186636 | A1* | 6/2020 | Wall | H04M 1/006 |
| 2020/0301661 | A1* | 9/2020 | Pasko | G10L 15/32 |
| 2020/0364711 | A1* | 11/2020 | Sarin | G06Q 20/401 |
| 2020/0382545 | A1* | 12/2020 | Cropp | G06F 21/6263 |

OTHER PUBLICATIONS

Sensitive Data & Call Redaction Software, CallMiner. (n.d). Retrieved from https://callminer.com/products/redact.

Ortiz, Amelia. "How to Regulate Compliance with Speech Analytics." VoiceBase, Jun. 24, 2020, https://www.voicebase.com/how-to-regulate-compliance-with-speech-analytics/.

Taylor, Ian. "PCI Compliance and Call Recording Explained." UC Today, Jun. 23, 2017, www.uctoday.com/contact-centre/analytics/pci-compliance-call-recording-explained/.

* cited by examiner

PROTECTING USER DATA DURING AUDIO INTERACTIONS

The present disclosure relates generally to data security, and relates more particularly to devices, non-transitory computer-readable media, and methods for protecting user data during audio interactions.

BACKGROUND

Fraud costs consumers billions of dollars each year, collectively. Moreover, an individual victim of fraud may spend much time trying to repair the non-financial damage of the fraud, such as replacing credentials and equipment, resetting access to accounts, and the like. For instance, a consumer may receive an email, a phone call, or even an in-person solicitation from a person claiming to have some legitimate need for the user's financial information such as a credit card number. If the person is not who they claim to be, however, the consumer may end up having to pay for purchases he did not make or authorize. The consumer may also spend a great deal of time and effort disputing fraudulent charges to his credit card, obtaining a new credit card with a new credit card number, and updating the credit card number on accounts that are automatically charged to the credit card.

SUMMARY

The present disclosure broadly discloses methods, computer-readable media, and systems for protecting user data during audio interactions. In one example, a method performed by a processing system includes detecting an audio signal that is part of an interaction between a user and another party, converting the audio signal into a string of text, detecting that the interaction is likely to put sensitive data of the user at risk, based on a comparison of the string of text to a library of interactions that are known to put sensitive data at risk, and sending, in response to detecting that the interaction is likely to put the sensitive data of the user at risk, an alert to notify the user that the interaction is likely to put the sensitive data of the user at risk, wherein the alert is sent to prevent the user from providing the sensitive data to the another party, and wherein the method is performed contemporaneously with an occurrence of the interaction.

In another example, a non-transitory computer-readable medium may store instructions which, when executed by a processing system in a communications network, cause the processing system to perform operations. The operations may include detecting an audio signal that is part of an interaction between a user and another party, converting the audio signal into a string of text, detecting that the interaction is likely to put sensitive data of the user at risk, based on a comparison of the string of text to a library of interactions that are known to put sensitive data at risk, and sending, in response to detecting that the interaction is likely to put the sensitive data of the user at risk, an alert to notify the user that the interaction is likely to put the sensitive data of the user at risk, wherein the alert is sent to prevent the user from providing the sensitive data to the another party, and wherein the method is performed contemporaneously with an occurrence of the interaction.

In another example, a device may include a processing system including at least one processor and a non-transitory computer-readable medium storing instructions which, when executed by the processing system when deployed in a communications network, cause the processing system to perform operations. The operations may include detecting an audio signal that is part of an interaction between a user and another party, converting the audio signal into a string of text, detecting that the interaction is likely to put sensitive data of the user at risk, based on a comparison of the string of text to a library of interactions that are known to put sensitive data at risk, and sending, in response to detecting that the interaction is likely to put the sensitive data of the user at risk, an alert to notify the user that the interaction is likely to put the sensitive data of the user at risk, wherein the alert is sent to prevent the user from providing the sensitive data to the another party, and wherein the method is performed contemporaneously with an occurrence of the interaction.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
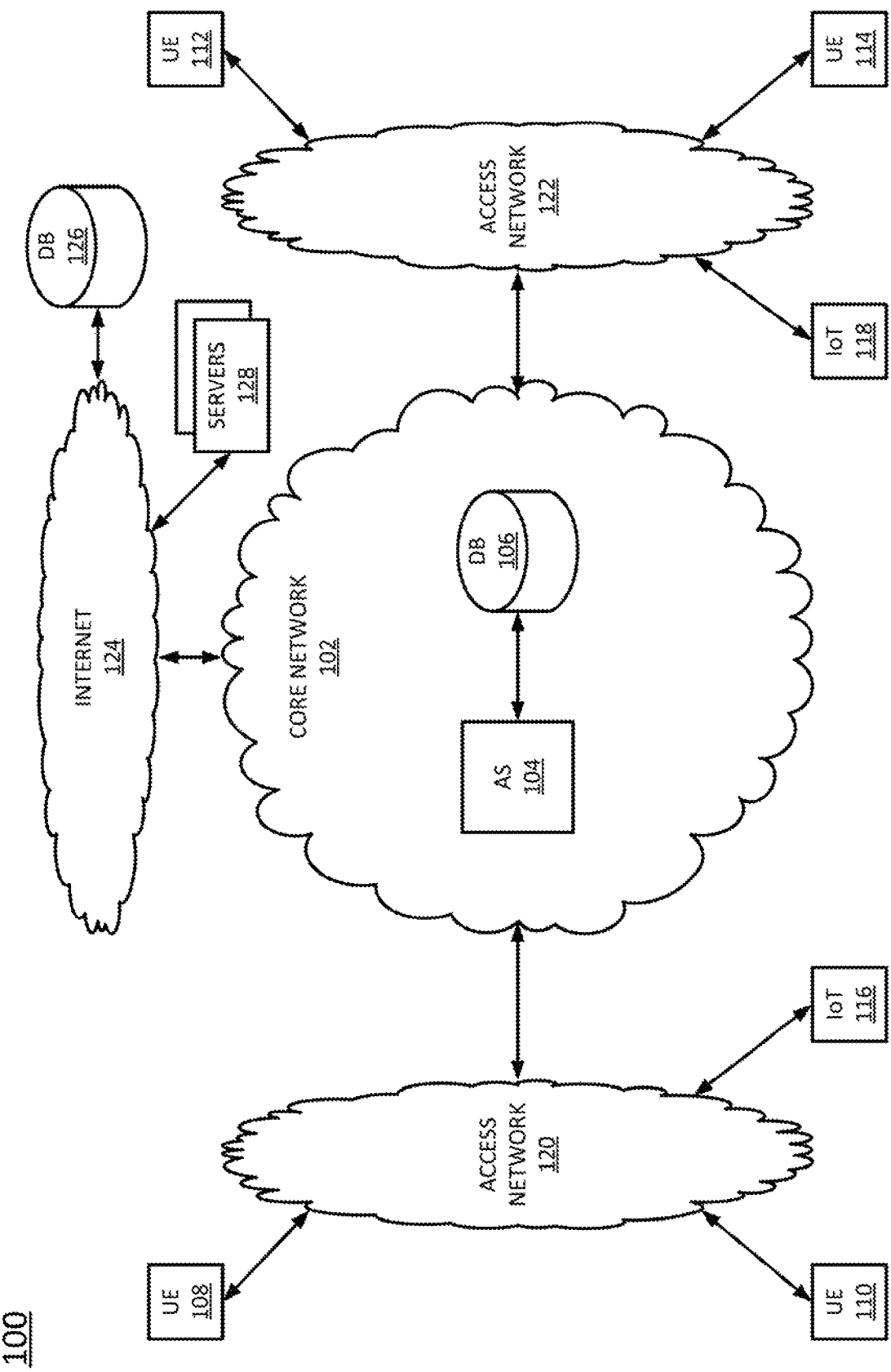
FIG. 1 illustrates an example system in which examples of the present disclosure for protecting user data during audio interactions may operate.

The present disclosure broadly discloses methods, computer-readable media, and systems for protecting user data during audio interactions. As discussed above, fraud costs consumers billions of dollars each year, collectively. Moreover, an individual victim of fraud may spend much time trying to repair the non-financial damage of the fraud, such as replacing credentials and equipment, resetting access to accounts, and the like. As the individuals perpetrating the fraud become more creative with their approaches and their uses of technology, it becomes more difficult, particularly for less technologically savvy consumers, to tell whether an individual requesting sensitive or personal or financial data has a legitimate need for the data or is trying to obtain the data for fraudulent purposes.

For instance, in one scam that is becoming alarmingly common, an individual may receive a phone call from a caller claiming to be the individual's grandchild (or a person who is allegedly in contact with the individual's grandchild). The "grandchild" may claim that there is an emergency (e.g., their car broke down, or they are in the hospital, or they are stranded in a foreign country), and may ask the individual to immediately send a large sum of cash via a money transfer service. In reality, however, the individual's grandchild may be perfectly fine, and the caller may be a stranger attempting to coerce money out of the individual.

In another common scam, an individual may receive a phone call from a caller claiming to be from the Internal Revenue Service or from a service provider such as the electric company or the water company. The caller may claim that the individual owes back taxes or is delinquent on a bill and subjected to immediate loss of utility services. The caller may ask that the individual purchase a gift card as a means of payment, and provide the gift card number and pin to the caller.

Although the above described scams are well known, they managed to fool large numbers of people, including elderly people, before they became widely known. Moreover, even though most people now know to be cautious when receiving a phone call such as one of the calls described above, many people are still unaware of the dangers posed by the calls. Additionally, some callers may rely on the element of surprise in order to fool an individual when his or her guard may be down (e.g., such as calling in the middle of the night).

In another more dangerous scam, an individual may actually physically arrive at the potential victim's home, work or car and request information from the potential victim. In certain scenarios, the individual may even request that the potential victim performs a specific action instead of just providing verbal sensitive information. For example, the individual may ask the potential victim to open a door to a home or a car door, to provide a physical key to a door or a safe deposit box located in a bank, or to provide physical cash on the spot, and the like. For example, the scammer may pose as a bank employee who is delivering replacement keys for safe deposit boxes that have recently received new installed locks. In turn, the scammer may now require the potential victim to surrender his or her "old" safe deposit keys.

Examples of the present disclosure function as a technologically savvy third party in audio interactions between a user and another party. For instance, in one example, a processing system may listen in on an audio interaction (e.g., a phone call or an in-person conversation) between a user and another party. When the processing system detects a word or phrase in the audio interaction that may signal a risk to the user's sensitive data (e.g., personal and/or financial information) or requiring the user to perform a risky action (e.g., surrendering his or her safe deposit box key), the processing system may alert the user to the fact that his or her sensitive data (or in one embodiment his or her action) may be at risk (e.g., by activating a visible, audible, and/or tactile alert), thereby minimizing the chance that the user will reveal the sensitive data to the other party (or perform the risky action as requested by the other party). For example, personal information may comprise a social security number, a passport number, a driver license number, birthday information, place of birth information, prior employment information, family relationship information and the like. For example, financial information may comprise bank account numbers, pin numbers, cash amounts in the bank accounts, safe deposit box number, the name of banking institutions holding the user's funds, passwords on bank accounts, user log in names to bank websites, and the like. In further examples, the processing system may interrupt the interaction to ask the other party questions, to answer on behalf of the user, and/or to direct the other party to another individual (such as the user's family member or caregiver). Thus, examples of the present disclosure may act on the user's behalf in order to protect the user's sensitive data from other parties who may try to obtain the sensitive data (e.g., through unsolicited interactions initiated by the other parties). These and other aspects of the present disclosure are discussed in greater detail below in connection with the examples of FIGS. 1-3.

To further aid in understanding the present disclosure, FIG. 1 illustrates an example system 100 in which examples of the present disclosure for protecting user data and/or preventing the performance of a risky action during audio interactions may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104 and at least one database (DBs) 106. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114 and the AS 104, between the user endpoint devices 108, 110, 112, 114, the Internet of Things (IoT) devices 116 and 118, and the AS 104, other components of the core network 102, devices reachable via the Internet in general, and so forth.

In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, a wearable smart device (e.g., a smart watch, smart glasses, or a fitness tracker) an application server, a bank or cluster of such devices, and the like.

The access networks 120 and 122 may also be in communication with one or more Internet of Things (IoT) devices 116 and 118, respectively. The IoT devices 116 and 118 may comprise wired or wireless devices that are installed in a user's home or business. The IoT devices 116 and 118 may be controlled, via a controller, a mobile device, a computer, or the like, to control one or more systems in the user's home or business. For instance, the IoT devices 116 and 118 may comprise alarm systems, smart thermostats, doorbells including cameras, smart lighting systems, virtual assistants, smart audio systems, and/or other types of devices.

Figure 3:
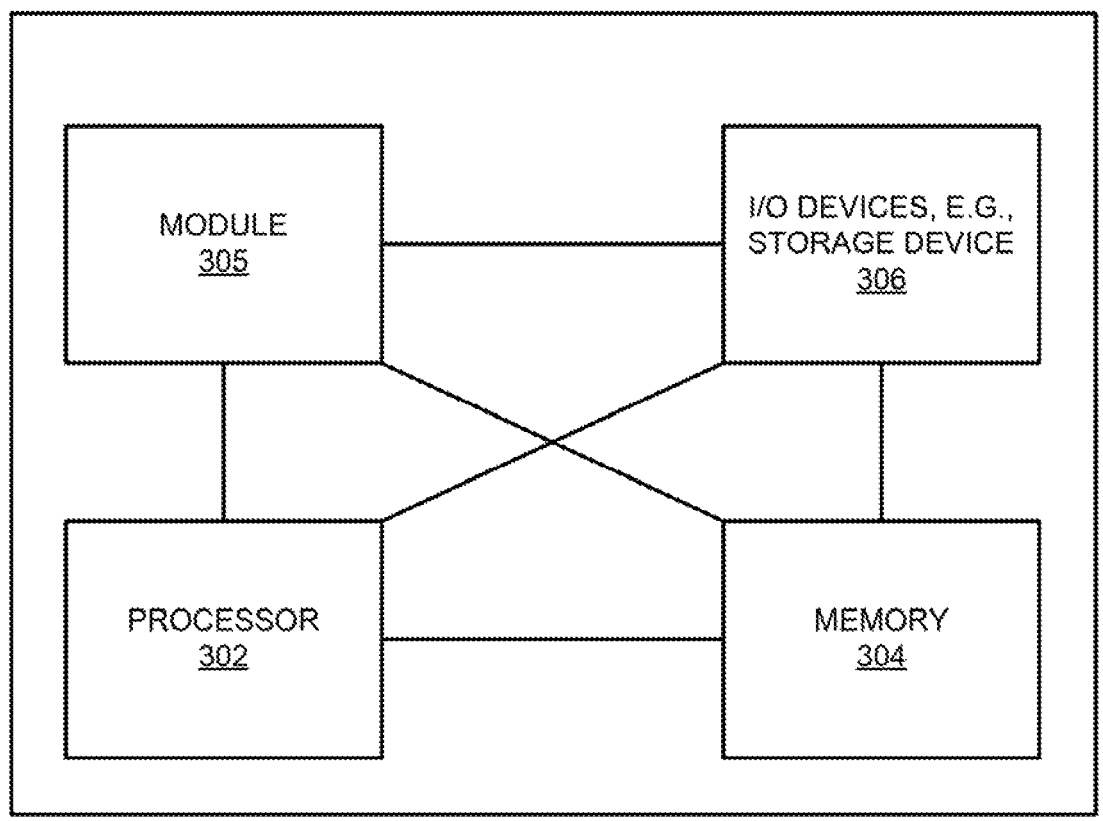
FIG. 3 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for protecting user data during audio interactions, as described herein. The AS 104 may comprise one or more physical devices, e.g., one or more computing systems or servers, such as computing system 300 depicted in FIG. 3, and may be configured as described below to protect user data during audio interactions. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the AS 104 may be configured to protect user data and/or preventing the performance of a risky action during audio interactions. As discussed above, an audio interaction may comprise a phone call or an in-person conversation in which a user is involved. The AS 104 may cooperate with a user endpoint device of the user, such as one of the user endpoint devices 108, 110, 112, or 114 or one of the IoT devices 116 or 118 (e.g., a phone via which the user is having a phone call, or a virtual assistant in a room in which the user is having a conversation) in order to protect the user's sensitive data and/or preventing the performance of a risky action during the audio interaction. For instance, the user endpoint device may listen to the audio interaction and may send all or parts of the interaction to the AS 104 for analysis (e.g., to determine whether the audio interaction is likely to put the user's sensitive data at risk and/or to cause the performance of a risky action by the user). Alternatively, the user endpoint device may send keywords extracted from audio interaction by the user endpoint device to the AS 104, where the AS 104 may analyze the keywords for likelihood of risk. In another example, the user endpoint device may send non-audio data about the audio interaction to the AS 104 for analysis, such as a phone number from which a caller is calling, an alleged name of the caller, a company that the caller claims to represent, or the like.

As discussed in further detail below, the AS 104 may analyze data about the audio interaction (e.g., transcripts, keywords, and/or other data) against a library of interactions that are known to be risky (e.g., likely to be fraudulent, to put sensitive user data at risk, or to cause the performance of a risky action). One specific example of a method for protecting user data during audio interactions according to the present disclosure is described in greater detail in connection with FIG. 2.

The DB 106 may store information about audio interactions that are known to be fraudulent or risky (e.g., likely to put sensitive data at risk or cause the performance of a risky action). For instance, each entry in a database 126 may be associated with a historical instance, or a composite of historical instances, of an audio interaction (e.g., phone call or in-person conversation) that was fraudulent or risky. The instance of the historical audio interaction may further be associated with certain keywords that are most strongly correlated with fraud, or most strongly correlated with a risk to sensitive data. For instance, in the example discussed above, where the caller claims to be a relative who needs money, words or phrases such as "emergency," "cash," "money transfer," "wire transfer," "PIN number," "social security number," "bank account number," "saving account number," or the like, may indicate a higher likelihood of risk. Similarly, the instance of the historical audio interaction may further be associated with certain interaction or conversation patterns that are most strongly correlated with fraud, or most strongly correlated with a risk to sensitive data or performance of a risky action, e.g., "give me your safe deposit key," "give me your house key," "give me your car key," "open your door now," "open your window now," "step outside now," "come to the street," "open your garage door," and so on. Following the same example, an interaction pattern that is considered to be risky may include the following events in order (possibly with other events occurring in between): (1) the caller claims to be a relative or in contact with a relative who is in trouble, e.g., who is being detained or very sick; (2) the caller states that there is an emergency situation (e.g., detainment, hospitalization, etc.); and (3) the caller asks for money to be immediately be sent via a money transfer to address the emergency situation. Keywords, patterns, and other data directly taken from the audio of an interaction may be referred to herein as intrinsic data.

The instance of the historical audio interaction may further be associated with extrinsic data that is most strongly correlated with fraud, or most strongly correlated with a risk to sensitive data. The extrinsic data may include, for example, the time of day at which the call is received (e.g., the middle of the night), the phone number from which the call is received (e.g., the phone number may have been involved in multiple instances of the same fraudulent interaction), the country, state, or region from which the call originated, the company the caller alleged to be involved with or is being represented, and/or other data.

In one example, the DB 106 may comprise a physical storage device integrated with the AS 104 (e.g., a database server or a file server), or may be attached or coupled to the AS 104, in accordance with the present disclosure. In one example, the AS 104 may load instructions into a memory, or one or more distributed memory units, and execute the instructions for protecting user data and/or preventing the performance of a risky action during audio interactions, as described herein.

In one example, one or more servers 128 and databases (DBs) 126 may be accessible to the AS 104 via Internet 124 in general. The servers 128 may include Web servers that support physical data interchange with other devices connected to the World Wide Web. For instance, the Web servers may support Web sites for Internet content providers, such as social media providers, ecommerce providers, service providers, news organizations, and the like. At least some of these Web sites may include sites via which users may report fraudulent communications (e.g., phone numbers from which fraudulent calls were received, phishing emails, and the like).

In one example, the databases 126 may store information about audio interactions that are known to be fraudulent or risky (e.g., likely to put sensitive data at risk and/or to cause the performance of a risky action). For instance, the databases 126 may contain information that is similar to the information contained in the DB 106, described above.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 and IoT devices 116 and 118 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
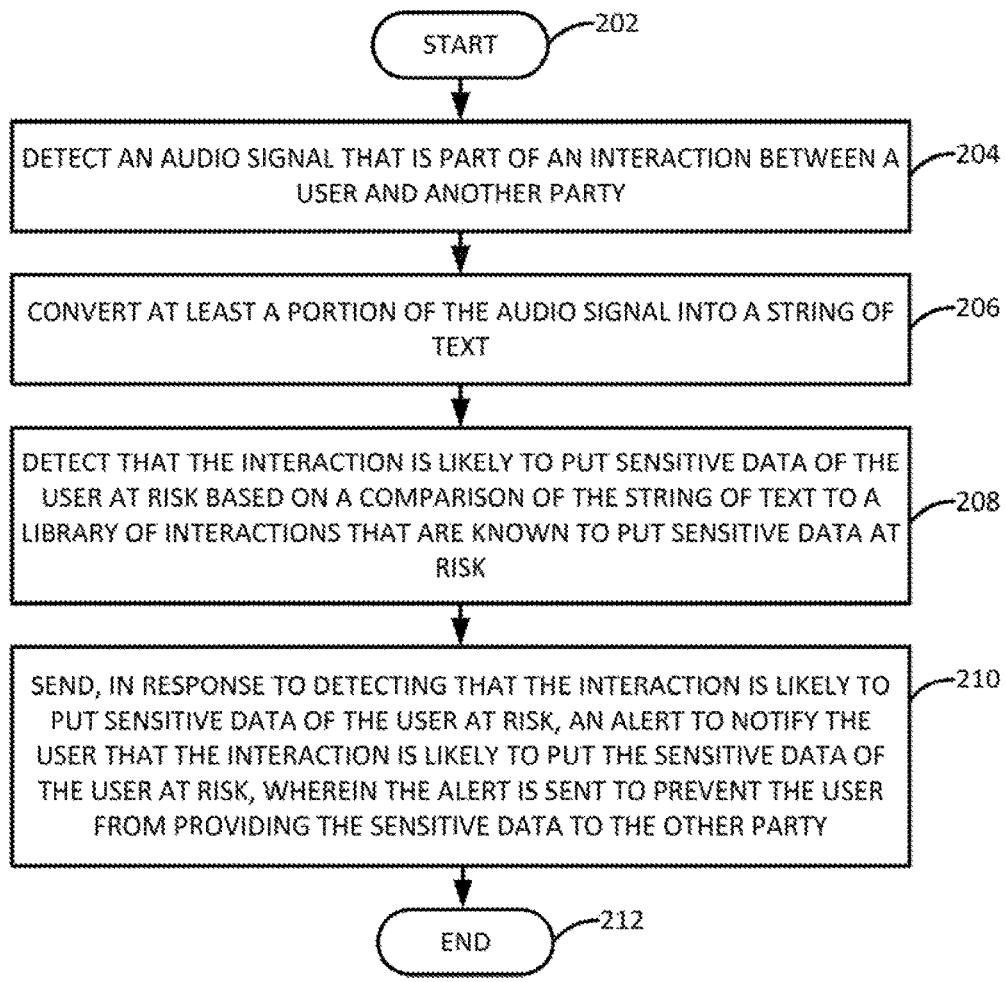
FIG. 2 illustrates a flowchart of an example method for protecting user data during audio interactions, in accordance with the present disclosure.

FIG. 2 illustrates a flowchart of an example method 200 for protecting user data (and/or preventing the performance of a risky action) during audio interactions, in accordance with the present disclosure. In one example, steps, functions and/or operations of the method 200 may be performed by a device as illustrated in FIG. 1, e.g., AS 104, a UE 108, 110, 112, or 114, an IoT device 128 or 130, or any one or more components thereof. In one example, the steps, functions, or operations of the method 200 may be performed by a computing device or system 300, and/or a processing system 302 as described in connection with FIG. 3 below. For instance, the computing device 300 may represent at least a portion of the AS 104 in accordance with the present disclosure. For illustrative purposes, the method 200 is described in greater detail below in connection with an example performed by a processing system, such as processing system 302. In one example, the method 200 is performed contemporaneously with the occurrence of an interaction between a user (e.g., a person who subscribes to a service that protects user data) and another party. In other words, the steps of the method 200 may be performed in real time, as the interaction is occurring.

The method 200 begins in step 202 and proceeds to step 204. In step 204, the processing system may detect an audio signal that is part of an interaction between a user and another party. For instance, the interaction may comprise a phone call (e.g., a video call or an audio-only call), where the phone call may have been initiated either by the user (e.g., a call by the user to a customer service number) or by the other party (e.g., an unsolicited call, a call from a purported service provider, etc.). In this case, the other party may be a human entity or a non-human entity (e.g., a bot or the like), where the human or non-human nature may be unclear or unknown to the user.

However, in another example, the interaction may comprise an in-person interaction between the user and the other party (e.g., an interaction with a cashier at a store, with a solicitor inside or outside the user's home, with a stranger who has approached the user in public, etc.). In this case, the other party is most likely a human entity.

In one example, the interaction is initiated by the other party rather than by the user. That is, the other party may approach the user, unsolicited and/or under false pretenses, to initiate the interaction. As described in further detail below, the method 200 may operate on behalf of the user to protect the user against any breaches of privacy (and/or preventing the performance of a risky action) that may result from the unsolicited interaction.

In one example, the processing system executes a program in the background of a device of which the processing system is a part (e.g., the user's mobile phone or wearable smart device). The program may "listen" continuously for audio signals. In one example, the program may listen specifically for audio signals in which the user's voice can be detected (where one or more speech or audio processing techniques may be used to determine whether the audio signal includes utterances made by the user, which may indicate that the user is involved in a verbal interaction with another party).

In step 206, the processing system may convert at least a portion of the audio signal into a string of text (e.g., a string of words or phrases). For instance, the processing system may utilize one or more speech to text conversion techniques to generate a transcript of the interaction, where the transcript may comprise a plurality of strings of text. A string of text in this context may represent all or part of an utterance made by the user and/or the other party (e.g., one or more words uttered by the user and/or the other party).

In step 208, the processing system may detect that the interaction is likely to put sensitive data of the user at risk (and/or to cause the performance of a risky action), based on a comparison of the string of text to a library of interactions that are known to put sensitive data at risk (and/or to cause the performance of a risky action). For instance, as discussed above, the processing system may have access (e.g., directly, or indirectly through an application server or other devices) to a database that stores a library of known interactions. Each known interaction in the library may comprise a historical observed instance (or a composite of multiple historical observed instances) in which a person's sensitive data was compromised (and/or the performance of a risky action). The string of text may be used as a query to search the library for any entries (known interactions) which share some threshold similarity with the string of text.

In one example, the interaction may be considered likely to put the sensitive data of the user at risk (and/or to cause the performance of a risky action) when a level of match between the string of text and an entry in the library of known interactions at least meets a threshold (e.g., at least a threshold number of words occur in both the string of text and the entry). For instance, a word in the string of text may be matched to a keyword that is associated with an interaction in the library. As an example, certain words, phrases, or topics may occur frequently in phishing scams and other types of risky or fraudulent interactions. These words, phrases, or topics may include, for instance, personal identifying terms (e.g., "social security number," "maiden name," "birth date," etc.), financial terms (e.g., "credit card," "bank account," "money order," etc.), security-related terms (e.g., "pin number," "password," etc.), or terms that pressure the user to act quickly (e.g., "emergency," "urgent," "time is of the essence," etc.).

In one example, an interaction may be determined to be likely to put sensitive data of the user at risk (and/or to cause the performance of a risky action) when at least a threshold number or a threshold percentage of words, phrases, or topics occurring in the string of text also occur in or are associated with an interaction in the library (e.g., at least x percent of the words in the string of text also occur in the same single interaction in the library, e.g., greater than 70%, 80%, or 90%). In one example, various sliding levels of risk may be associated with different thresholds. For instance, when a number or percentage of matching words, phrases of topics is below a first threshold, the interaction may be quantified as "low risk." When the number or percentage of matching words, phrases of topics is above the first threshold, but below a second threshold that is higher than the first threshold, the interaction may be quantified as "moderate risk." When the number or percentage of matching words, phrases of topics is above the second threshold, but below a third threshold that is higher than the second threshold, the interaction may be quantified as "high risk." When the number or percentage of matching words, phrases of topics is above the third threshold, the interaction may be quantified as "extremely high risk."

In another example, the presence of certain specific keywords in the string of text may trigger a determination that an interaction is risky, regardless of the total number or percentage of matching words in the string of text as a whole. For instance, if the text string contains a request for a user's social security number or the surrender of a safe deposit key, that fact alone may be enough to result in a determination that the interaction is likely to put sensitive data of the user at risk (and/or to cause the performance of a risky action).

In another example, an interaction may be determined to be likely to put sensitive data of the user at risk (and/or to cause the performance of a risky action) when a pattern of the interaction between the user and the other individual, as reflected in the string of text, matches a pattern of an interaction in the library. For instance, some known types of risky or fraudulent interactions follow similar patterns. As an example, an interaction may begin with a stranger asking to buy some item that a user has posted for sale on a Web site. The stranger may continue by offering to send the user a money order or cashier's check for more than the asking price of the item. The stranger may next ask that, immediately after the user deposits the money order or cashier's check, the user wire the difference between the amount sent and the asking price of the item back to the stranger. As another example, a stranger may notify the user that the user is a beneficiary of a will written by an individual unknown to the user. The stranger may ask for the user's bank account number in order to make a monetary transfer to the user, or may ask for the user's social security number as a way to allegedly verify the user's identity. As another example, the stranger may arrive at the user's door informing him or her that the bank has sent the stranger to collect "old" safe deposit box keys as a service to bank consumers given that new locks having been recently installed in all of the safe deposit boxes in the particular bank.

In a further example, the interaction may be considered likely to put the sensitive data of the user at risk (and/or to potentially cause the performance of a risky action) if when a level of match between the string of text and an entry in the library of known interactions at least meets a threshold, plus some other risk factors are present. The other risk factors may include extrinsic data about the interaction (whereas the contents of the audio interaction, e.g., the utterances spoken, may comprise intrinsic data about the interaction). The other risk factor may comprise, for instance, an inability of the other party to respond or to respond satisfactorily to a challenge that is designed to verify the other party's identity. For instance, upon determining that the interaction is likely to put the sensitive data of the user at risk (and/or to cause the performance of a risky action), the processing system may send a code, a captcha, or the like to a phone number from which the other party is calling (or to an email address associated with an organization from which the other party is allegedly calling). The processor may then ask the other party to provide the code, captcha, or the like that the processor sends. If the other party is unable to provide the code, captcha, or the like, then this may indicate that the other party is not who they say they are. Alternatively or in addition, the processing system may request the other party's name, the other party's title, the other party's supervisor's name, or other information that may be cross referenced against some data source (e.g., a social media page or a web site of the company from which the other party is alleged to be calling) to verify the information's authenticity.

Failure to respond correctly to the challenge might also indicate that the other party is non-human, such as a bot. For instance, many phone-based fraud schemes may utilize an automatic dialer or similar system to place phone calls. Upon reaching an individual who answers their phone and/or provides some preliminary amount of information, the call could subsequently be handed off to a human party who attempts to extract further information from the user.

Alternatively or in addition, the other risk factor may comprise a non-audio risk factor, such as whether a phone number from which the other party is calling is known (e.g., not hidden or showing as "unavailable" or "out of area") or is known to be associated with risky interactions (e.g., is known to be associated with previous phone calls that put sensitive data of other people at risk, based on the information in the library of interactions). In another example, the phone number from which the other party is calling may fail to match a phone number of an entity that the other user is alleged to represent. For instance, the other party may say that he is calling from XYZ Bank. However, the processing system may, upon looking up a phone number for XYZ Bank, determine that the number from which the other party is calling (e.g., a number showing on the caller ID of the user's mobile phone) does not match the phone number for XYZ bank. As another example, the other party may say that he is calling in regards to an account that the user has with some institution (e.g., a bank, a telecommunications service provider, a social media site, etc.). However, the processing system may, upon reviewing the user's email, banking records, social media history, or other records, determine that no such account exists.

In step 210, the processing system may send, in response to detecting that the interaction is likely to put the sensitive data of the user at risk, an alert to notify the user that the interaction is likely to put the sensitive data of the user at risk (and/or to cause the performance of a risky action), wherein the alert is sent to prevent the user from providing the sensitive data to the other party or from performing the risky action. In other words, the alert is timed to occur before the user can reveal the sensitive data or perform the risky action. For instance if the other party has asked for the user's social security number, the alert may be generated before the user can provide the social security number, thereby preserving the safety of the sensitive data.

In one example, the alert may comprise a visual alert (e.g., a flashing light or a text message), and audible alert (e.g., a beep or a pre-recorded verbal message), or a tactile alert (e.g., a vibration or rumble). In one example, the alert may be generated by the same device or which the processing system is a part. For instance, if the processing system is part of the user's mobile phone, the processing system may send a signal to the mobile phone's speaker to generate an audible alert. In another example, the alert may be generated by another device that is in the user's vicinity (and within communication range of the device of which the processing system is a part), such as an Internet of Things device. For instance, the processing system may send a signal to an alarm panel in the user's home that causes a light on the alarm panel to flash or a speaker to sound an alert. By generating the alert from a device that is separate from the processing system, the alert may be less easily detected by the other party.

In another example, the alert may include the processing system interrupting the interaction in order to pause the interaction or to take over control of the interaction. For instance, the processing system may mute the user's side of a telephone conversation or place the other party on hold on the call before generating an alert (e.g., an audible, visible, and/or tactile alert) to let the user known that his or her sensitive data is likely to be at risk. In another instance, the home alarm panel may broadcast a request from a speaker for the user to step away from the house door and return to the kitchen area, the bedroom area, and so on. Pausing the interaction in this way may allow the processing system to discreetly provide more information about the interaction to the user (e.g., provide a link to a web site explaining a common scam call that shares similarities with the interaction). The pause may also provide the user with some time to think about the interaction and any information he or she may be asked to provide to the other party, which may be useful if the other party is using pressure tactics in order to convince the user to provide the information (e.g., claiming an emergency situation). The pause may also deter the other party from continuing the interaction (e.g., if the other party is indeed a party who is trying to defraud the user, the pause may cause the other party to worry that the fraud will be discovered or is currently being discovered). For example, the other party may leave the user's premises immediately or depart from the house door.

In another example, the processing system may request permission from the user to conduct the remainder of the interaction on the user's behalf. If permission is received from the user, then, in response, the processing system may interact with the other party on the user's behalf. For instance, the processing system may utilize one or more speech synthesis and/or machine learning techniques in order to conduct the user's side of the interaction (e.g., similar to an interactive voice response system). When the processing system takes over the interaction in this way, the processing system may be able to prevent the user from further disclosing sensitive information to the other party and/or to decline performance of a risky action. The other party may also be deterred from continuing the interaction.

In another example, the alert may include a suggestion to move the interaction to another location in which the sensitive data of the user may be less at risk. For instance, if the other party approached the user in person (e.g., at home or in a store), the processing system may suggest that the interaction be moved somewhere else, possibly where other individuals may be able to observe the interaction (e.g., outside of the user's house or near a security station). In another example, the alert may include a suggestion to consult with another individual who is known to the user (e.g., a family member or caregiver) prior to continuing the interaction.

The method 200 may end in step 212. Thus, examples of the method 200 may be able to monitor a user's audio interactions with other parties (e.g., in-person and/or phone conversations) for events that may signify the possible disclosure of sensitive user data (and/or to cause the performance of a risky action). The examples of the method 200 may be able to quantify a risk associated with the disclosure of the sensitive user data, e.g., by identifying a likelihood that the other party is requesting the sensitive user data for illegitimate or fraudulent purposes (and/or to cause the performance of a risky action). Where the disclosure of the sensitive user data (and/or the performance of a risky action) is determined to be high-risk (e.g., likely to result in fraud upon the user), the examples of the method 200 may be able to prevent or minimize the disclosure of sensitive user data (and/or the performance of a risky action) by warning the user.

For instance, a user may receive a call where the caller claims to be a representative of the user's bank, and the caller may ask the user to verify some item of sensitive data, such as the user's social security number. Upon detecting the request for the social security number, examples of the method 200 may take a number of actions in order to determine a likelihood that the caller is really from the user's bank. For instance, the processing system may interrupt the conversation and ask the caller one or more questions in order to verify the caller's identity. The processing system may ask for the caller's name or the branch location of the bank from which the caller is calling. The processing system may perform an Internet search on the caller's name, title, and/or supervisor, the bank name, and/or the branch location in order to verify whether a person with the caller's name works for the user's bank at the alleged branch location (for instance, the information may be verified on the caller's social media accounts or on the bank's web site). The processing system may also ask the caller to verify the user's current account balance and/or last transaction, which the processing system may compare by logging into the bank's web site using the user's login and password.

The processing system may also ask the caller to provide a number at which to call the caller back, for instance in order to determine whether a number appearing on the user's caller ID has been spoofed. The processing system could also ask the caller to call the user's family member or caregiver at a different number in order to continue the conversation. Alternatively, the processing system may automatically transfer or reroute the ongoing call to a phone number associated with the user's family member or caregiver, or may automatically conference the phone number associated with the user's family member or caregiver into the ongoing call. In such a case, the processing system may automatically pause or mute the ongoing call until the user's family member or caregiver is on the line. In this way, the processing system may prevent the user from revealing any information and/or taking any action until his or her family member or caregiver can be consulted.

The processing system may also perform an Internet search and/or query a library of known fraudulent interactions or activities in order to see if the phone number from which the caller is calling is associated with any known fraudulent interactions or activities. For instance, other users who have been contacted from the same number from which the caller is calling may report that the calls were suspicious.

Examples of the present disclosure could also be used to protect sensitive user data in situations in which the user initiates an interaction. For instance, the user may request that the method 200 be launched in order to place a phone call to the user's life insurance company, where the purpose of the call is to ask a question about the user's life insurance policy. In this case, the processing system may interact with a human operator or with an interactive voice response system that the life insurance company uses to route phone calls. For instance, the processing system may answer one or more questions intended to confirm the user's identity (e.g., name, address, policy number, etc.) and may flag any questions that seem unusually intrusive (e.g., based on a comparison to questions asked in other similar calls with the same or other users, which may be analyzed using machine learning techniques to learn what types of questions are to be expected).

In further examples, the method 200 may be used to protect the user against audio interactions which may not necessarily put sensitive data at risk, but which may nevertheless be undesirable. For instance, the processing system may detect that the other party is swearing excessively or using threatening or aggressive language, and may advise the user to end the call.

The method 200 therefore provides an improvement to technology designed to protect user privacy by detecting situations in which the user may be asked to provide sensitive data or perform a risky action. The situations are detected in real time, i.e., as the situations are occurring. The method 200 then acts in real time to prevent the user from providing the sensitive data or from taking the risky action. Thus, the method 200 provides a more effective way to preserve the safety of sensitive data than methods which remove sensitive data from recordings or transcripts of interactions after the fact. In the latter case, the sensitive data has already been revealed, and redacting the sensitive data from the recordings or transcripts may minimize, but not completely eliminate, the risk to the sensitive data. Examples of the present disclosure go a step further by preventing the sensitive data from being revealed in the first place (unless there is a legitimate need for the sensitive data to be revealed).

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for protecting user data (and/or to prevent the performance of a risky action) during audio interactions, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for protecting user data (and/or to prevent the performance of a risky action) during audio interactions (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for protecting user data (and/or to prevent the performance of a risky action) during audio interactions (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    detecting, by a processing system including at least one processor, an audio signal that is part of an interaction between a user and another party, wherein the interaction is unsolicited by the user, and wherein the interaction between the user and the another party is a phone conversation via a call;
    converting, by the processing system, the audio signal into a string of text;
    detecting, by the processing system, that the interaction is likely to put sensitive data of the user at risk, based on a comparison of the string of text to a library of known interactions that are known to put sensitive data at risk; and
    sending, by the processing system in response to the detecting that the interaction is likely to put the sensitive data of the user at risk, an alert to notify the user that the interaction is likely to put the sensitive data of the user at risk, wherein the alert is timed to be sent before the user provides the sensitive data to the another party, and wherein the alert comprises a suggestion to conference into the interaction another individual who is known to the user whose sensitive data is likely to be put at risk before continuing the interaction, wherein the method is performed contemporaneously with an occurrence of the interaction.

2. The method of claim 1, where the processing system listens continuously for audio signals including the audio signal.

3. The method of claim 1, wherein the detecting that the interaction is likely to put the sensitive data of the user at risk comprises:
    matching, by the processing system, a word in the string of text to a keyword that is associated with an interaction in the library of known interactions.

4. The method of claim 1, wherein the detecting that the interaction is likely to put the sensitive data of the user at risk comprises:
    matching, by the processing system, a pattern of the interaction between the user and the another party to a pattern of an interaction in the library of known interactions.

5. The method of claim 1, wherein the detecting is further based on a characteristic of the interaction that occurs outside of the audio signal, and wherein the characteristic comprises a characteristic that is known to be associated with interactions that are known to put sensitive data at risk.

6. The method of claim 5, wherein the characteristic is a phone number from which the another party is calling being associated with a phone number that is known to be associated with interactions that are known to put sensitive data at risk.

7. The method of claim 5, wherein the characteristic is a phone number from which the another party is calling being hidden from the user.

8. The method of claim 5, wherein the characteristic is a phone number from which the another party is calling failing to match a known phone number associated with an entity which the another party is alleged to represent.

9. The method of claim 1, further comprising:
    placing, by the processing system, the call on hold prior to the sending.

10. The method of claim 1, further comprising:
    issuing, by the processing system, a challenge to the another party, wherein the challenge is designed to verify an identity of the another party, and wherein the challenge comprises comparing information provided by the another party to information retrieved by the processing system from the Internet.

11. The method of claim 1, wherein the generating comprises:
    requesting, by the processing system, a permission from the user to conduct the interaction on behalf of the user; and
    interacting, by the processing system, with the another party directly in response to receiving the permission from the user to conduct the interaction on behalf of the user.

12. The method of claim 1, wherein the alert comprises at least one of: a visible alert, an audible alert, or a tactile alert.

13. The method of claim 1, wherein the processing system is part of a mobile phone of the user.

14. The method of claim 1, further comprising:
    muting, by the processing system, the user during the interaction until the another individual is conferenced into the call.

15. The method of claim 1, wherein the another individual is a family member or a caregiver of the user whose sensitive data is likely to be put at risk.

16. A non-transitory computer-readable medium storing instructions which, when executed by a processing system including at least one processor, cause the processing system to perform operations, the operations comprising:

detecting an audio signal that is part of an interaction between a user and another party, wherein the interaction is unsolicited by the user, and wherein the interaction between the user and the another party is a phone conversation via a call;

converting the audio signal into a string of text;

detecting that the interaction is likely to put sensitive data of the user at risk, based on a comparison of the string of text to a library of interactions that are known to put sensitive data at risk; and sending, in response to the detecting that the interaction is likely to put the sensitive data of the user at risk, an alert to notify the user that the interaction is likely to put the sensitive data of the user at risk, wherein the alert is timed to be sent before the user provides the sensitive data to the another party, and wherein the alert comprises a suggestion to conference into the interaction another individual who is known to the user whose sensitive data is likely to be put at risk before continuing the interaction, wherein the method is performed contemporaneously with an occurrence of the interaction.

17. The non-transitory computer-readable medium of claim 16, the operations further comprising:

muting the user during the interaction until the another individual is conferenced into the call.

18. The non-transitory computer-readable medium of claim 16, wherein the another individual is a family member or a caregiver of the user whose sensitive data is likely to be put at risk.

19. A device comprising:

a processing system including at least one processor; and a non-transitory computer-readable medium storing instructions which, when executed by the processing system, cause the processing system to perform operations, the operations comprising:

detecting an audio signal that is part of an interaction between a user and another party, wherein the interaction is unsolicited by the user, and wherein the interaction between the user and the another party is a phone conversation via a call;

converting the audio signal into a string of text;

detecting that the interaction is likely to put sensitive data of the user at risk, based on a comparison of the string of text to a library of interactions that are known to put sensitive data at risk; and sending, in response to the detecting that the interaction is likely to put the sensitive data of the user at risk, an alert to notify the user that the interaction is likely to put the sensitive data of the user at risk, wherein the alert is timed to be sent before the user provides the sensitive data to the another party, and wherein the alert comprises a suggestion to conference into the interaction another individual who is known to the user whose sensitive data is likely to be put at risk before continuing the interaction, wherein the method is performed contemporaneously with an occurrence of the interaction.

20. The device of claim 19, wherein the another individual is a family member or a caregiver of the user whose sensitive data is likely to be put at risk.

\* \* \* \* \*